United States Patent
Wan et al.

(10) Patent No.: US 9,355,246 B1
(45) Date of Patent: May 31, 2016

(54) TUNING SANDBOX BEHAVIOR BASED ON STATIC CHARACTERISTICS OF MALWARE

(71) Applicants: Xiaochuan Wan, Nanjing (CN); Ben Huang, Nanjing (CN); Xuebin Chen, Nanjing (CN); Xiaodong Huang, Nanjing (CN); Hailiang Fan, Nanjing (CN)

(72) Inventors: Xiaochuan Wan, Nanjing (CN); Ben Huang, Nanjing (CN); Xuebin Chen, Nanjing (CN); Xiaodong Huang, Nanjing (CN); Hailiang Fan, Nanjing (CN)

(73) Assignee: Trend Micro Inc., Tokyo (JP)

(*) Notice: Subject to any disclaimer, the term of this patent is extended or adjusted under 35 U.S.C. 154(b) by 218 days.

(21) Appl. No.: 14/098,488

(22) Filed: Dec. 5, 2013

(51) Int. Cl.
  *G06F 11/00* (2006.01)
  *G06F 21/53* (2013.01)
  *H04L 29/06* (2006.01)

(52) U.S. Cl.
  CPC .............. *G06F 21/53* (2013.01); *H04L 63/1408* (2013.01); *H04L 63/1416* (2013.01); *H04L 63/1441* (2013.01)

(58) Field of Classification Search
  None
  See application file for complete search history.

(56) References Cited

U.S. PATENT DOCUMENTS

| | | | | |
|---|---|---|---|---|
| 6,330,590 B1 * | 12/2001 | Cotten | ................... | H04L 12/585 709/206 |
| 6,851,057 B1 * | 2/2005 | Nachenberg | .......... | G06F 21/563 703/23 |
| 6,971,019 B1 * | 11/2005 | Nachenberg | .......... | G06F 21/564 713/187 |
| 8,006,305 B2 * | 8/2011 | Aziz | ...................... | G06F 21/552 726/22 |
| 8,479,276 B1 * | 7/2013 | Vaystikh | ................ | G06F 21/577 713/160 |
| 8,555,392 B2 * | 10/2013 | Golovkin | ............ | H04L 63/1408 726/24 |
| 8,990,944 B1 * | 3/2015 | Singh | ...................... | G06F 21/56 726/24 |
| 9,104,867 B1 * | 8/2015 | Thioux | .................... | G06F 21/56 |
| 9,104,870 B1 * | 8/2015 | Qu | ......................... | G06F 21/563 |

(Continued)

OTHER PUBLICATIONS

Cherukuri et al., Similarity Analysis of Shellcodes in Drive-by Download Attack Kits, © 2101 ICST, 8 pages.*

(Continued)

*Primary Examiner* — Jeffrey Pwu
*Assistant Examiner* — Baotram Tran
(74) *Attorney, Agent, or Firm* — Beyer Law Group LLP

(57) ABSTRACT

An emulator on a host computer includes a static analysis module that analyzes executable code of a suspicious sample to determine whether the code identifies that a particular packing program (packer) has packed the sample. Once identified, a custom configuration file is generated that identifies particular API hooks or instructions that should be disabled (or enabled) so that the sample file cannot use these hooks or instructions to detect that it is executing within an emulator. The emulator (such as a virtual machine or sandbox) is configured using the configuration file. The suspicious sample is then executed and its behaviors are collected. The sample is prevented from detecting that it is operating within an emulator and thus prevented from terminating prematurely. Malicious behaviors are scored and a total score indicates whether or not the suspicious sample is malicious or not. Static analysis identifies signatures, instructions or strings.

15 Claims, 5 Drawing Sheets

(56) References Cited

U.S. PATENT DOCUMENTS

| | | | | | |
|---|---|---|---|---|---|
| 2012/0079596 | A1* | 3/2012 | Thomas | | G06F 21/55 726/24 |
| 2012/0260342 | A1* | 10/2012 | Dube | | G06F 21/564 726/24 |
| 2012/0278892 | A1* | 11/2012 | Turbin | | G06F 8/67 726/24 |
| 2012/0290848 | A1* | 11/2012 | Wang | | G06F 9/455 713/188 |
| 2012/0304244 | A1* | 11/2012 | Xie | | G06F 21/00 726/1 |
| 2013/0007883 | A1* | 1/2013 | Zaitsev | | G06F 21/567 726/24 |
| 2013/0111547 | A1* | 5/2013 | Kraemer | | G06F 21/552 726/1 |
| 2013/0269043 | A1* | 10/2013 | Limaye | | G06F 21/10 726/34 |
| 2014/0165207 | A1* | 6/2014 | Engel | | H04L 63/1425 726/25 |
| 2014/0201806 | A1* | 7/2014 | Kumar | | H04L 63/1416 726/1 |
| 2014/0215617 | A1* | 7/2014 | Smith | | H04L 63/1441 726/23 |
| 2015/0096022 | A1* | 4/2015 | Vincent | | G06F 21/566 726/23 |

OTHER PUBLICATIONS

Chunlei et al., A Software Vulnerability Analysis Environment Based on Virtualization Technology, © 2010 IEEE, 5 pages.*

Ding et al., Behavior-based Proactive Detection of Unknown Malicious Codes, © 2009 IEEE, 6 pages.*

Kolbitsch et al., The Power of Procrastination: Detection and Mitigation of Execution-Stalling Malicious Code, ACM © 2011, 12 pages.*

Lobo et al., Identifying Rootkit Infections Using Data Mining, © 2010 IEEE, 7 pages.*

Tian et al., Differentiating Malware from Cleanware Using Behavioural Analysis, © 2010 IEEE, 8 pages.*

* cited by examiner

Anti-Emulation Technique

Emulation Architecture

```
{
    {
        "name":"kernel32.dll",
        "API":                                           420
        [
            {"name":"CheckRemoteDebuggerPresent",    "enable":true},
            {"name":"CopyFileExW",                   "enable":true},
            {"name":"OpenProcess",                   "enable":true},
            {"name":"RemoveDirectoryW",              "enable":true},
            {"name":"SetFileAttributesW",            "enable":true},
            {"name":"SetFileTime",                   "enable":true},
            {"name":"SetThreadContext",              "enable":true},
            {"name":"Sleep",                         "enable":true},
            {"name":"SleepEx",                       "enable":true},
            {"name":"TerminateProcess",              "enable":true},
            {"name":"Module32NextW",                 "enable":true},
        ]
    },
}

[                  432
    {
        "name":"Themida",
        "version":"",
        "API":
        [
            {"name":"SleepEx"}
        ]                    434
    }
]
```

410

FIG. 4
Configuration File

TUNING SANDBOX BEHAVIOR BASED ON STATIC CHARACTERISTICS OF MALWARE

FIELD OF THE INVENTION

The present invention relates generally to detection of malicious software on a computer. More specifically, the present invention relates to countering anti-emulation techniques used by malicious software.

BACKGROUND OF THE INVENTION

Attacks upon computer systems are increasingly becoming more sophisticated and targeted. One particular type of threat, known as an advanced persistent threat (APT), refers to targeted attacks that aggressively pursue and compromise chosen targets, and is commonly associated with a government or other entity that has the resources to maintain such an attack. Often, such a long-term pattern of attacks is aimed at other governments or companies. Individuals are usually not referred to as being an advanced persistent threat because they rarely have the resources to launch a sophisticated attack or to be persistent. An advanced persistent threat is often characterized by targeting a specific organization or individual, deploying sophisticated self-defense techniques, covering tracks in order to maintain future access, etc.

One of the sophisticated self-defense techniques addresses the use of an emulator to detect malicious software. As known, emulation is an effective dynamic malware analysis technique. Many malware analysis tools make use of an emulator such as Trend Micro's SandCastle, JoeBox software, the Anubis service, the CWSandbox service, etc. Most all of these emulators collect the behavior of an executing malware sample by monitoring the invocation of system API functions. But, advanced malware uses a variety of self-defense techniques to detect the existence of an emulator. Such malware includes embedded code specifically written to detect that the malware is actually executing inside of an emulator instead of natively on the host computer. Using this code, if the malware determines that it is executing inside of an emulator then it will simply terminate (or otherwise cease its malicious behavior), thus thwarting the efforts of the emulator to collect its malicious behavior and characterize the malware.

Because such malware is becoming more sophisticated at using these self-defense techniques, further techniques are desired to counter these self-defense techniques in order to continue to collect malicious behavior of a malware sample.

SUMMARY OF THE INVENTION

To achieve the foregoing, and in accordance with the purpose of the present invention, a technique is disclosed that can detect malware packed by any packer program. The technique effectively detects encrypted malicious samples without a significant impact on system performance.

In a first embodiment, an emulator on a host computer (such as a virtual machine) inputs a suspicious file and performs a static analysis of the executable code of that file to determine if the file has been packed by a particular program (such as by a packer). If so, then a configuration file is modified to include the name (or names) of a particular software API hook that should be disabled. The configuration file is used by the emulator to disable the hook or hooks. The suspicious file is then executed and its behaviors collected. The executing suspicious file will not be able to detect that an emulator is present because it cannot detect the disabled API hook. Accordingly, the suspicious file will not prematurely terminate but will exhibit its behaviors in the normal course of its execution.

In a second embodiment, an emulator on a host computer (such as a virtual machine) inputs a suspicious file and performs a static analysis of the executable code of that file to determine if the file has been packed by a particular program (such as by a packer). If so, then a configuration file is modified to include the name (or names) of a particular instruction or instructions (such as at the assembly language level) that should be disabled. The configuration file is used by the emulator to disable the instruction or instructions. The suspicious file is then executed and its behaviors collected. The executing suspicious file will not be able to detect that an emulator is present because it cannot detect the disabled instruction. Accordingly, the suspicious file will not prematurely terminate but will exhibit its behaviors in the normal course of its execution.

In a third embodiment, an emulator on a host computer (such as a sandbox) inputs a suspicious file and performs a static analysis of the executable code of that file to determine if the file has been packed by a particular program (such as by a packer). If so, then a configuration file is modified to include the name of a particular function (such as the SleepEx API) that should be enabled. The configuration file is used by the emulator to enable the function. The suspicious file is then executed and its behaviors collected. The executing suspicious file will not be able to detect that an emulator is present because it detects that the function is enabled and operating normally (as opposed to such a function that is often disabled in an emulator). Accordingly, the suspicious file will not prematurely terminate but will exhibit its behaviors in the normal course of its execution.

BRIEF DESCRIPTION OF THE DRAWINGS

The invention, together with further advantages thereof, may best be understood by reference to the following description taken in conjunction with the accompanying drawings in which:

FIG. 4 is a configuration file used by the emulation software, for example by the coordinator module.

DETAILED DESCRIPTION OF THE INVENTION

Figure 1:
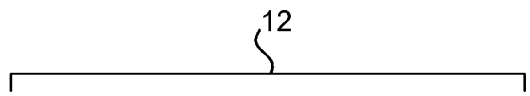
FIG. 1 shows the anti-emulation technique used by this packer.

As known in the art, an emulator is hardware or software (or both) that duplicates (or emulates) the functions of a host computer system (or other hardware) so that the emulated behavior closely resembles the behavior of the host system (or other hardware). One implementation of an emulator is a virtual machine that emulates the host computer. As is known in the art, a virtual machine is a software implementation of a machine that is able to execute programs like a physical machine. A virtual machine is typically installed on top of the original operating system running on a computer. The virtual machine provides a complete system platform supporting the execution of a complete operating system. This operating system may simulate the original operating system or may emulate a different operating system (non-native operating system) or hardware environment. A virtual machine, though, is less efficient than the real machine. Examples of virtual machines include Qemu, Xen, Bochs and Virtual Box.

A sandbox is a term for a security mechanism used for separating programs on a computer and is often used to detect advanced persistent threats, as well as other malware. A sandbox typically provides a tightly controlled set of resources for guest programs to run in, such as scratch space on disk and memory. Network access, the ability to inspect the host system or the ability to read from input devices is usually disallowed or heavily restricted. Sandboxes include execution on native hosts (replicating a target computer system) as well as on virtual machines in which the guest operating system runs "in a sandbox" in the sense that it does not execute natively on the host computer and can only access host resources through the virtual machine. Sandboxes are used by antivirus service providers to analyze malware behavior; by creating an environment that mimics an actual computer, researchers can determine how malware infects and compromises a computer. Sandboxes include products such as the Multi-Vector Virtual Execution (MVX) product available from FireEye, Inc.

As mentioned above, it is realized that sophisticated malware (such as APT malware) can detect when it is executing inside of an emulator and then terminate, thus thwarting the collection of malicious behavior. It is further realized that API hooks are often used to monitor the invocation of system API functions by a malware sample, and that the malware sample can often detect the use of such hooks. In one embodiment, an emulator uses both system API hooks and API hooks injected into the malware sample. For instance, some critical APIs (such as WriteProcessMemory, CreateProcess, CreateRemoteThread, etc.) will be hooked in a dll file and the dll file will be injected into the malware sample's process address space. Further, a malware sample may use other techniques to determine if an emulator is in use such as performing a time check, checking for special instructions, checking for special APIs, etc.

It is further realized that these anti-emulation techniques are usually provided by packer programs. As known in the art, a packer program uses executable compression in order to compress (or encrypt, or both) an executable file while combining the compressed data with the corresponding decompression code to form a single executable file. When the executable file is executed, the decompression code re-creates the original code. A packer is often used by legitimate software to minimize download times and storage space, or to protect copyrighted code, but is also used by malicious software to disguise the contents of a malicious file and to evade analysis by an emulator, virtual machine or sandbox. Examples of packer programs include UPX, ASProtect, Themida and RDG Tejon Crypter.

Various of these packer programs offer anti-emulation features that provide special anti-emulation code that can be incorporated into the malicious software when it is packed by the packer program. For many of the more advanced packing programs (such as Themida, VMProtect, Armadillo, etc.) it can be difficult, if not impossible, to unpack (i.e., decompress or decrypt) the packed code. If the code cannot be unpacked, the virtual machine has no a priori knowledge that the sample is malicious and might contain anti-emulation techniques. Further, the anti-emulation techniques are implemented at the instruction level, meaning that the anti-emulation techniques cannot be countered at the API level. For these reasons, further techniques are desired to counter these anti-emulation techniques and several realizations have been made as described below.

One example of an anti-emulation check provided by the packer Themida utilizes the system API "SleepEx" to determine if a virtue machine is present and may use the following pseudo code.
   Time1=timeGetTime( );
   SleepEx(50 ms, true);
   Time2=timeGetTime( );
   If (time2−time1<50 ms)
   {terminate program to avoid analysi}

Any malicious software utilizing this particular packer is likely to use this anti-emulation check. Thus, if it is known ahead of time that a particular malicious sample had been packed using Themida before the malicious sample is executed in the virtual machine, steps may be taken to counter the anti-emulation technique. In this example, the malicious software knows that some emulators hook the SleepEx function in order to skip it and to speed up simulation. So, the anti-emulation check determines whether the function is operating normally. Thus, the virtual machine may disable the API hook used in the system API "SleepEx" in order to prevent the malicious sample from detecting the virtual machine. In other words, once the API hook has been disabled the malicious sample will not be able to determine that a virtual machine is present using the above check. In general, it is realized that many of the system API hooks used in virtual machines can be easily detected by a malicious sample (using code provided by packer programs), thus making it difficult to collect the behavior exhibited by a malicious sample (because the malicious sample will shut down).

Another example of an anti-emulation check provided by the packer RDG Tejon Crypter utilizes backdoor instruction support to determine if a virtual machine (in this case, VMware) is present.

FIG. 1 shows the anti-emulation technique used by this packer. This figure is part of screenshot of Ollydbg used when analyzing a sample. The first column is the address of the instruction in the current process's memory space, and the second column is the byte code of the instruction. Shown are instructions in the third column 12 provided by the packer. In particular, instruction 14 ("in eax, dx") is an instruction used by the virtual machine VMware to implement a backdoor. When this instruction is executed within VMware a jump will be performed, the malware will detect that this jump has occurred, know that a virtual machine is present, and the malware will terminate.

Thus, if it is known ahead of time that a particular malicious sample had been packed using RDG Tejon Crypter before the malicious sample is executed in the virtual machine, steps may be taken to counter the anti-emulation technique. For example, the virtual machine may disable the backdoor instruction support in VMware by changing settings in order to prevent the malicious sample from taking advantage of the above check. In other words, once this backdoor instruction support has been disabled the malicious sample will not be able to determine that a virtual machine is present using the above check.

In general, packers often provide code enabling a malicious sample to detect whether or not system APIs are hooked (indicating that an emulator is present). Examples of other system APIs that may be hook by an emulator include Sleep, SleepEx, MessageBox, GetProcAddress, etc. In order to counter these anti-emulation techniques, the emulator may choose to disable these API hooks, thus preventing the malicious sample from detecting the use of such hooks and terminating execution prematurely.

In another anti-emulation example, the malicious sample may use a data loop to call the API "Message Box" many times, and then use the results of these calls (indicating that a hook is present) to determine that it is executing within an emulator. To counter this technique, the emulator may disable the hook for "MessageBox." If it is known ahead of time that a particular packer has been used and that this particular packer calls this API, then the emulator may disable the hook in this API.

System Block Diagram

Figure 2:
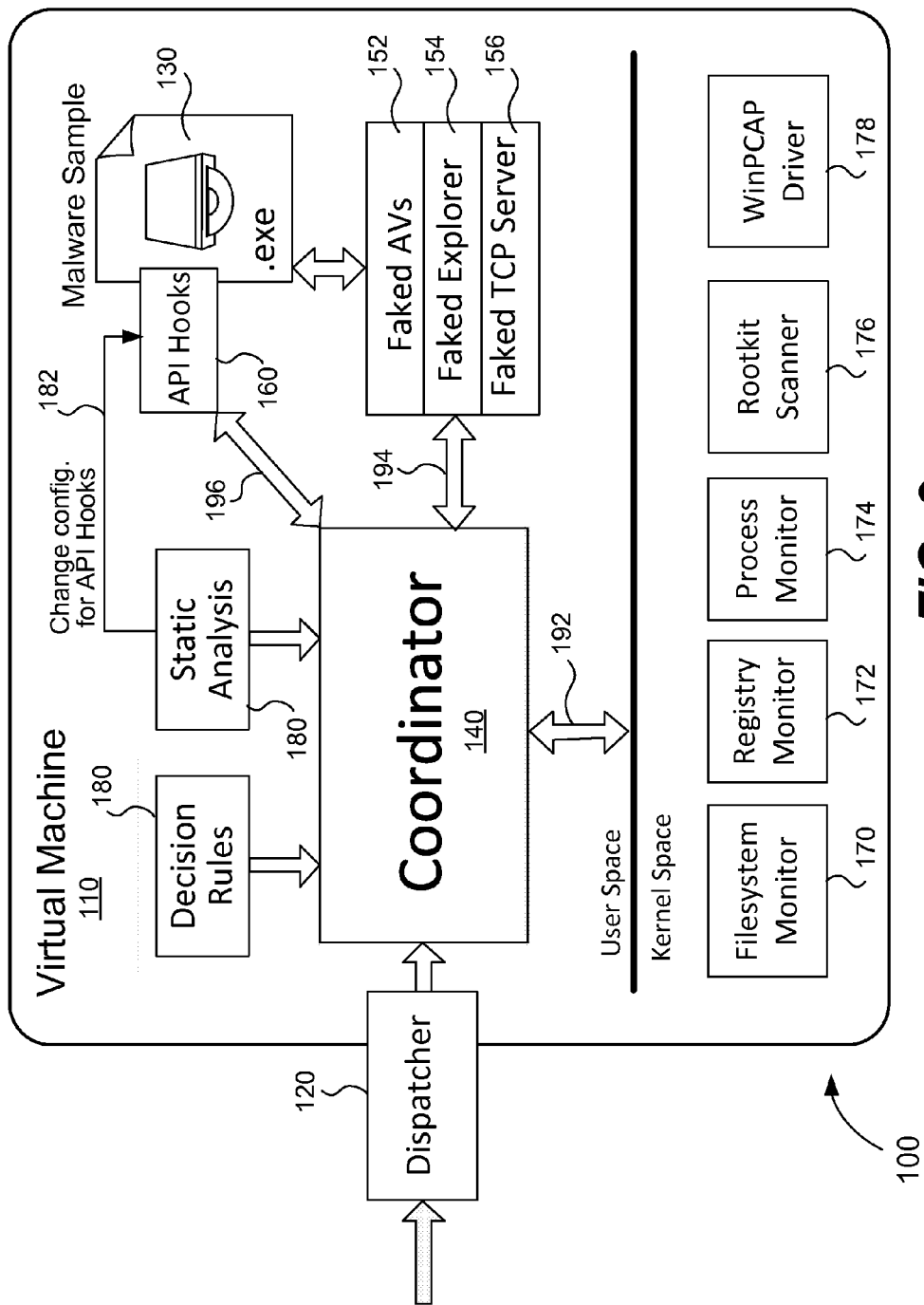
FIG. 2 is a block diagram of an architecture according to one embodiment of the present invention.

FIG. 2 is a block diagram of an architecture 100 according to one embodiment of the present invention. Included is a single virtual machine 110 executing upon a computer. In one preferred embodiment, the Microsoft operating system XP or version 7 executes upon this virtual machine. Executing within this operating system is a dispatcher software module 120 that accepts input sample files from any hardware appliance or software associated with the computer. In one embodiment, the input sample files for analysis are received from a Threat Discovery Appliance (TDA) which is a hardware appliance available from Trend Micro Inc. that screens for suspicious files. A user may also submit samples from a Trend Micro product's user interface or input samples from another product's output, for example, an E-mail Gateway Product can output an e-mail attachment.

The present invention is applicable to sample files that may execute with a wide variety of software applications. Of course, the present invention is not limited to particular software applications and their respective file formats, but may include many others as well. Shown at 130 is a sample file. Coordinator 140 is a software module arranged to control the life cycle of sample file execution, including: executing the sample files themselves or their associated application program; injecting hooks into executable sample files or into their application program; and collecting various behaviors as the sample files or application programs execute.

Any number of so-called "bait" processes 152-156 may also be executing within the virtual machine in order to attract attacks from any sample files that may be malicious. For example, these processes include one or more fake antivirus programs 152, a fake browser program 154, and any number of fake TCP servers 156. Also, any number of API hooks 160 are injected (during startup) into an executable sample file or into a software application executing a sample file in order to collect any "win32" API calls, for example (using hooking of DLLs). For example, the dll will be injected into the sample's process address space. The kernel space of the operating system also includes any number of kernel hooks 170-178 used to collect any kernel level behaviors found during execution of the sample file or of its corresponding application program.

Decision rules 180 is a database of various suspicious behaviors that may occur during execution of the sample file or of its corresponding application program. This database includes registry behaviors (AutoRun registries, sensitive registries, deletion of registries, deceptive registries, added or modified registries, etc.), file behaviors (startup files, sensitive files, dropped files, deceptive files, suspicious name, added or modified files, etc.), process behaviors (added services, terminated processes, deleting self, bypassing a firewall, downloading a file, etc.), and network behaviors (sending e-mail, malicious Web site, port scanning, downloading a file, opening a port and listening, visiting a URL, IRC connection, etc.). These decision rules are used to determine which sample files may be malicious based upon their behaviors. In one embodiment, each particular malicious behavior is given a score and a final score is cumulative of all of the individual scores.

In general, the workflow operates as follows. The dispatcher chooses a sample file for analysis and notifies the coordinator module 140. The coordinator 140 resets all hooks and prepares the bait processes. The coordinator also injects all API hooks and collects behaviors of the sample. Behaviors include 192 which are the behaviors exhibited by the executing malware sample and collected by any of the monitors and scanners 170-178 executing in kernel space. Also included are behaviors 194 collected in response to interaction with any of the fake programs 152-156, and behaviors 196 collected via API hooks 160 that had been injected into the malware sample. Once collected, these behaviors are matched against the decision rules 180 and a score for the sample file is determined. Further detail on how the workflow operates is described below.

Flow Diagram

Figure 3:
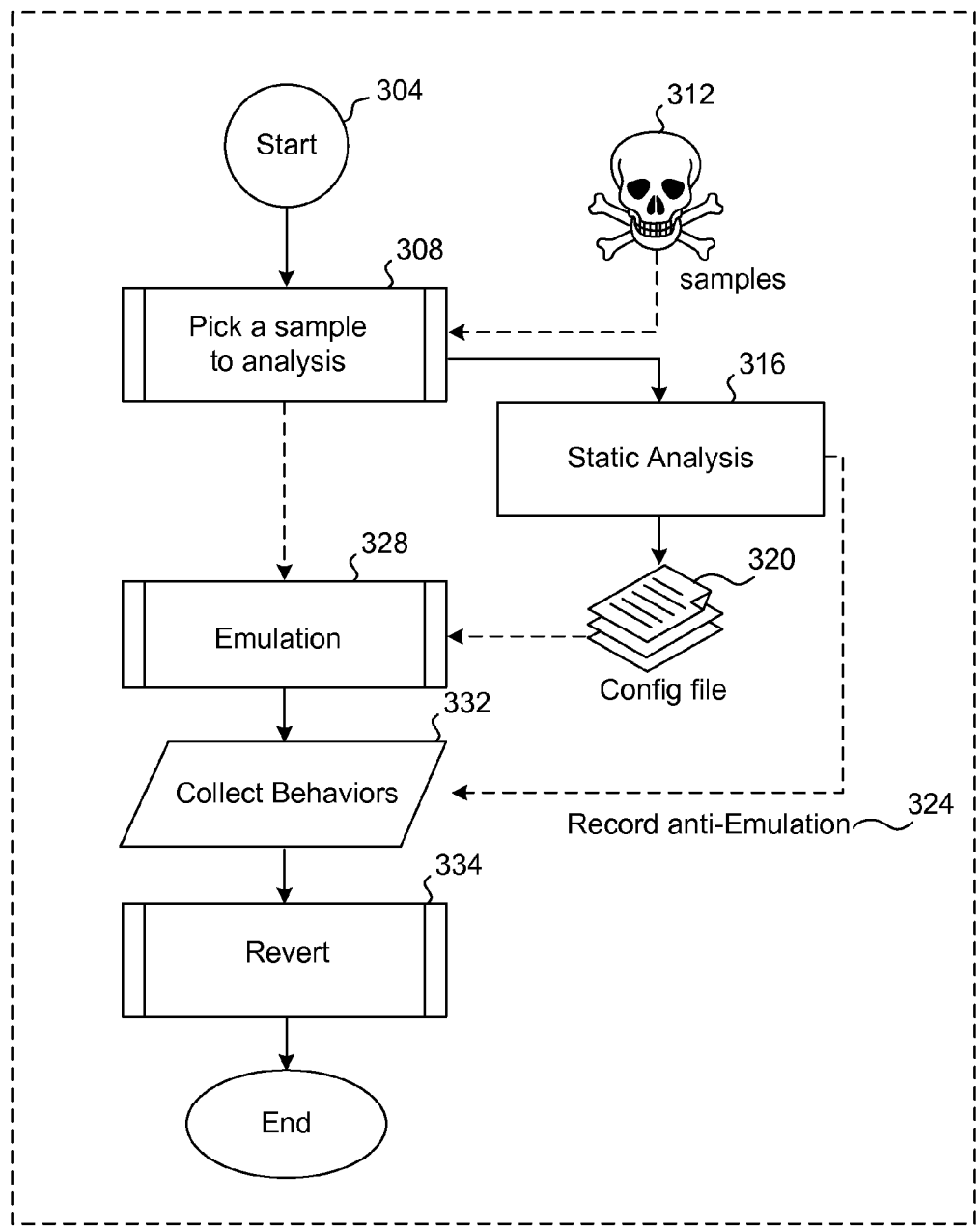
FIG. 3 is a flow diagram describing one embodiment of the invention.

FIG. 3 is a flow diagram describing one embodiment of the invention. In a first step 304 the virtual machine 110 is in an initial state within its host computer which has been restarted and the host computer is free of malicious software. In step 308 a software sample is input for analysis. This software is suspected of being malware and is also suspected of having been compressed or encrypted (or both) using a packing program. Software sample 312 is preferably an executable file and in a specific embodiment is a PE file. Upon input, the sample is first analyzed using static analysis module 180 before the sample is executed.

In step 316 the static analysis module 180 performs an analysis of the static executable code of the input malware sample in an attempt to identify if it is likely that the sample has been packed using a particular packing program. The analysis looks for a unique signature in the sample (typically found at the beginning of the entry point or in the middle of the program), an identifying string of characters, or special instructions that will also identify the packer. Accordingly, the static analysis module includes a database with a variety of signatures, identifying strings and special instructions, along with their corresponding packer names.

For example, the signature=89 1C 24 E8 01 00 00 00 CC identifies the malware sample as having been packed by the Themida packer, versions 2.0.xx-2.1.xx, available from Oreans Technologies. Other such signatures identify other versions of this packer as well as other packers. Included with each signature in the database may be flag indicating whether not the signature only occurs in the entry point of the PE files to facilitate searching. Regarding identifying strings, executable files packed by the packer UPX will have section names such as "UPX0," "UPX1," etc. If these strings are found during a static analysis of an executable file, it is likely that the file has been packed by the UPX packing program. Special instructions included in the database that will identify particular packers include the VMware backdoor instruction "in eax, dx" used in Themida, and the "CPUID" instruction used in RDG Tejon Crypter, among other instructions.

Thus, the result of step 316 is that a particular packer that has packed the sample executable file is identified, along with a particular version of that packer. This result will allow a custom configuration of the emulator to be performed using a configuration file. Such a configuration will prevent the executing malware sample from detecting that the emulator is present.

FIG. 4 is a configuration file 410 used by the emulation software, for example by coordinator 140. Included within the configuration file is a list of APIs 420 which are configured to be enabled in the emulator. Also shown is the name of a packer 432 and a particular API 434. In step 320 the static analysis module then modifies this configuration file by listing certain actions to disable particular APIs, to disable particular instructions, to enable certain functions, or to take other actions that will prevent a particular packing program from determining that it is operating within an emulator. In this example, the static analysis of the executable code has determined that the code has been packed by the Themida packer. Accordingly, the configuration file 410 is modified to include a listing 432 indicating the packer and a listing 434 of a particular API that should be disabled. In one embodiment the configuration file includes any number of packers and their corresponding list of APIs. Thus, it is an aggregation of certain actions to take with each packer. Once the particular packer used is identified, then only those actions are taken in the emulator to thwart the malware.

As mentioned, the configuration file may also be modified to disable a particular instruction that a malicious sample might be looking for. For example, if it is determined that the sample has been packed by the RDG packer, the configuration file may be modified to indicate that the backdoor instruction should be disabled such that if the sample attempts to use it nothing will happen. Or, a function such as the Sleep function previously mentioned may be enabled to operate normally such that a malicious sample will not be able to check if an emulator is present by utilizing the Sleep function.

In step 324 any anti-emulation behaviors not previously identified as being associated with a packer detected during the static analysis are recorded. In a specific embodiment, certain identifying strings and special instructions detected in the executable code may indicate that the sample is malicious. Nevertheless, these behaviors are treated with caution and scores are not assigned to them as it is also possible that benign executable files use the same strings and instructions. Strings such as "VMware," "VMware Tools," "AntiSandbox" may be found within an executable file indicating that the executable file is likely malicious in that it will attempt to use an anti-emulation technique against one of these emulators. Or, special instructions that indicate anti-virtualization code may be found. These detected anti-emulation behaviors are passed along to step 332 which also collects behaviors of the executing sample. Once these behaviors are collected, the API hook settings may be adjusted according to these behaviors, and finally, the behaviors collected will play a reference role when making a decision on a sample.

Once the configuration file has been modified in step 320 it is forwarded to the emulator in step 328 (such as virtual machine 110) along with an identification of the packer detected and the emulator changes its settings according to the configuration file and the detected packer. For example, using the configuration file 410, the emulator would then disable its SleepEx function 434 (because the packer Themida has been detected) so that the malicious sample will not be able to detect that an emulator is present.

Disabling an API hook is accomplished by unhooking the API. For example, as shown in FIG. 4, there is an "enable" attribute for each API which is checked before hooking a particular API. If the value is "true" the API will be hooked, if "false" the API will not be hooked. We can adjust the contents according to the result of static analysis (i.e., we can change "true" to "false," and thus the hook of the special API will be disabled). Thus, in this example, because the packer is Themida, "enable" for "SleepEx" is changed to "false." The emulator will also make use of any other packer-specific functions in the configuration file (such as disabling a backdoor instruction, enabling certain functions, etc.) in order to prevent the malicious sample from detecting that an emulator is present. For example, we can add: monitor_control.restrict_backdoor="True" into the configuration file which will disable the backdoor instruction of VMware.

The emulator via coordinator module 140 then begins execution of the malware sample and the malware sample begins to exhibit its behaviors (malicious, benign, or both), including behaviors 192, 194 and 196. Next, in step 332 the coordinator module collects all of these behaviors exhibited by the malware sample while it is executing. As previously explained, known collection techniques may be used such as using bait modules 152-156, API hooks 160, and monitors 170-178. The system may choose to collect only those behaviors that are deemed malicious. As known in the art, the malicious behaviors may be scored and a total score for the malware sample may be generated to indicate whether or not it is a malicious file.

In step 334 the virtual machine and the host computer are reverted to an initial state (such as by rebooting) in order to prepare for an analysis of the next malware sample.

Computer System Embodiment

Figure 5A:
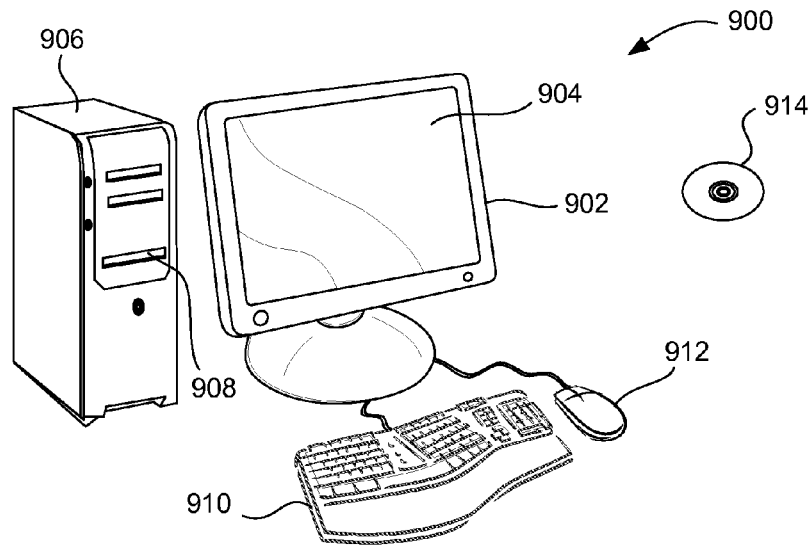
FIGS. 5A and 5B illustrate a computer system suitable for implementing embodiments of the present invention.
Figure 5B:
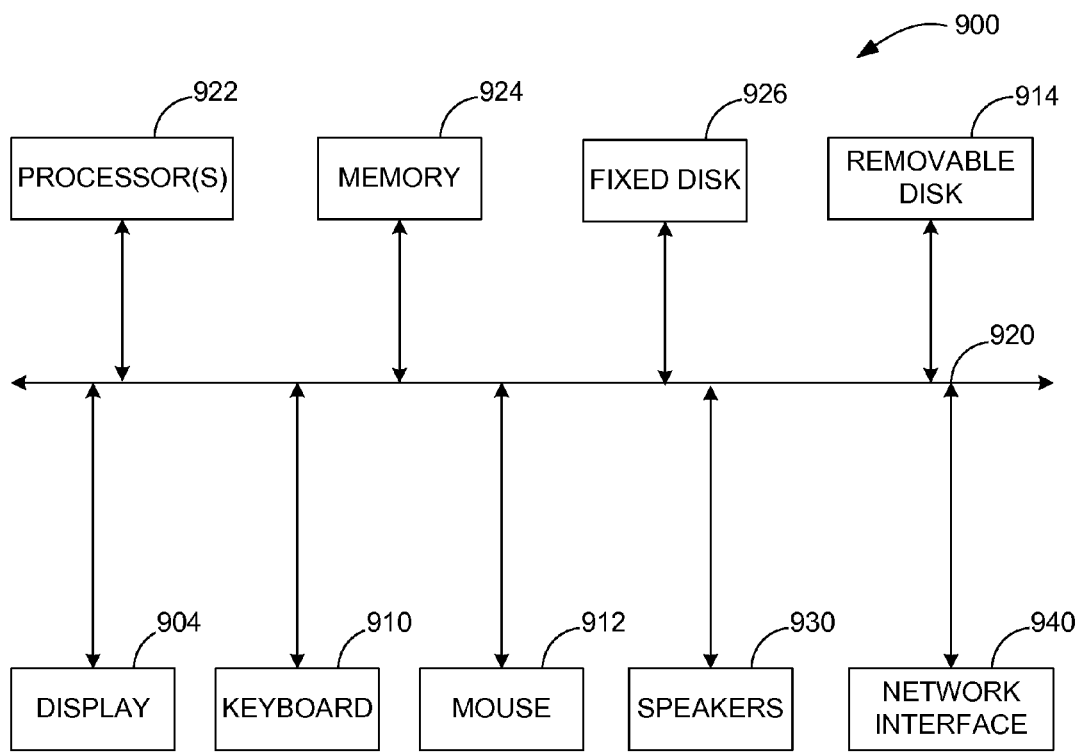

FIGS. 5A and 5B illustrate a computer system 900 suitable for implementing embodiments of the present invention. FIG. 5A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 5B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of collecting behaviors of a suspicious file, said method comprising:
   receiving said suspicious file on a host computer, said suspicious file including executable code and suspected of being malicious, and wherein said suspicious file is a file in portable executable format;
   analyzing said executable code before execution and identifying a packing program that has packed said executable code, and wherein said executable code has been compressed or encrypted by said packing program;
   disabling a software hook in an emulator of said host computer based upon said identified packing program;
   executing said suspicious file within said emulator of said host computer after said disabling; and
   collecting behaviors of said suspicious file while said suspicious file is executing within said emulator, said executing suspicious file not prematurely terminating by virtue of not detecting use of said software hook in said emulator.

2. The method as recited in claim 1 wherein said executable code includes a routine to detect said emulator of said host computer utilizing said software hook when said software hook is enabled.

3. The method as recited in claim 1 further comprising:
   identifying said packing program by identifying a signature, a string or an instruction in said executable code used by said packing program.

4. The method as recited in claim 1 further comprising:
   modifying a configuration file to identify said software hook;
   inputting said configuration file into said emulator.

5. The method as recited in claim 1 wherein said emulator is a virtual machine.

6. A method of collecting behaviors of a suspicious file, said method comprising:
   receiving said suspicious file on a host computer, said suspicious file including executable code and suspected of being malicious, and wherein said suspicious file is a file in portable executable format;
   analyzing said executable code before execution and identifying a packing program that has packed said executable code, and wherein said executable code has been compressed or encrypted by said packing program;
   disabling an instruction in an emulator of said host computer based upon said identified packing program;
   executing said suspicious file within said emulator of said host computer after said disabling; and
   collecting behaviors of said suspicious file while said suspicious file is executing within said emulator, said executing suspicious file not prematurely terminating by virtue of not detecting use of said instruction in said emulator.

7. The method as recited in claim 6 wherein said executable code includes a routine to detect said emulator of said host computer utilizing said instruction when said instruction is enabled.

8. The method as recited in claim 6 further comprising:
   identifying said packing program by identifying a signature, a string or an instruction in said executable code used by said packing program.

9. The method as recited in claim 6 further comprising:
   modifying a configuration file to identify said instruction;
   inputting said configuration file into said emulator.

10. The method as recited in claim 6 wherein said emulator is a virtual machine.

11. A method of collecting behaviors of a suspicious file, said method comprising:
    receiving said suspicious file on a host computer, said suspicious file including executable code and suspected of being malicious, and wherein said suspicious file is a file in portable executable format;
    analyzing said executable code before execution and identifying a packing program that has packed said executable code, and wherein said executable code has been compressed or encrypted by said packing program;
    enabling a function in an emulator of said host computer based upon said identified packing program;
    executing said suspicious file within said emulator of said host computer after said enabling; and
    collecting behaviors of said suspicious file while said suspicious file is executing within said emulator, said executing suspicious file not prematurely terminating by virtue of detecting use of said function in said emulator.

12. The method as recited in claim 11 wherein said executable code includes a routine to detect said emulator of said host computer not utilizing said function when said function is disabled.

13. The method as recited in claim 11 further comprising:
    identifying said packing program by identifying a signature, a string or an instruction in said executable code used by said packing program.

14. The method as recited in claim 11 further comprising:
modifying a configuration file to identify said instruction;
inputting said configuration file into said emulator.

15. The method as recited in claim 11 wherein said emulator is a virtual machine.

\* \* \* \* \*